J. D. RAUDEBAUGH.
NOVELTY.
APPLICATION FILED DEC. 1, 1915.

1,213,775.

Patented Jan. 23, 1917.

WITNESSES:
L. R. Johnson

INVENTOR.
James D. Raudebaugh
BY Abraham Knobel,
ATTORNEY.

UNITED STATES PATENT OFFICE.

JAMES DAVID RAUDEBAUGH, OF SAN DIEGO, CALIFORNIA.

NOVELTY.

1,213,775. Specification of Letters Patent. Patented Jan. 23, 1917.

Application filed December 1, 1915. Serial No. 64,485.

*To all whom it may concern:*

Be it known that I, JAMES DAVID RAUDEBAUGH, a citizen of the United States, and resident of San Diego, in the county of San Diego and State of California, have invented a new and useful Novelty, of which the following is a specification.

This invention relates to ladies' combined purses, hand bags, purses and vanity boxes, and some of the objects of my improvement are, means for lighting and viewing the face, hair, hat and adornments and apparel of the person, in the dark, means for lighting the inside of the purse, in order to view the contents, make change and the like, in the dark, and means for lighting the way and objects in the dark, simplicity of construction and operation, and comparative inexpensiveness of manufacture.

These and other objects I attain by means of the device illustrated in the accompanying drawings, in which—

Figure 1:
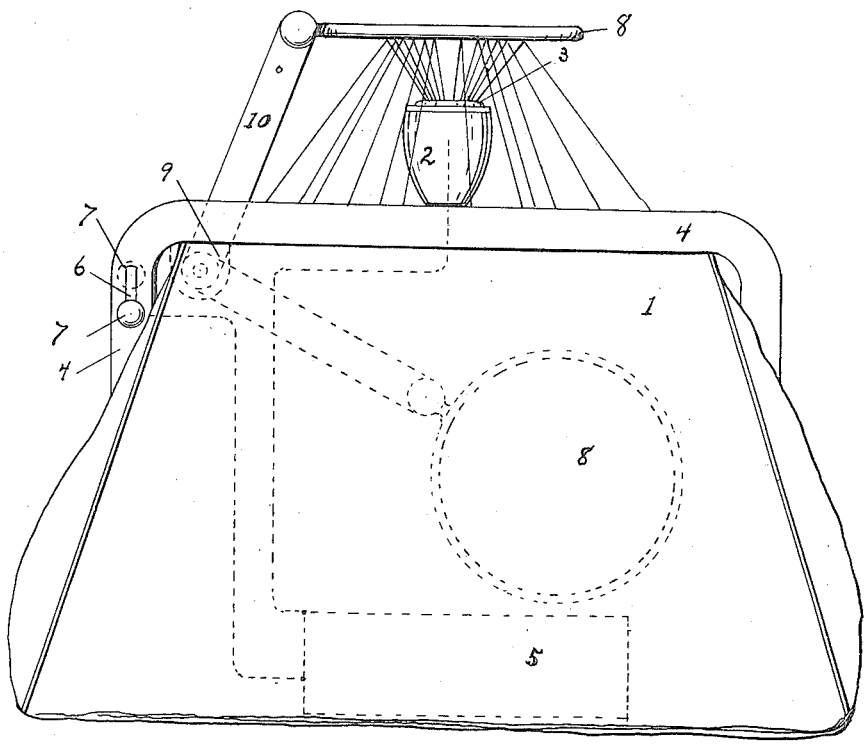
Figure 2:
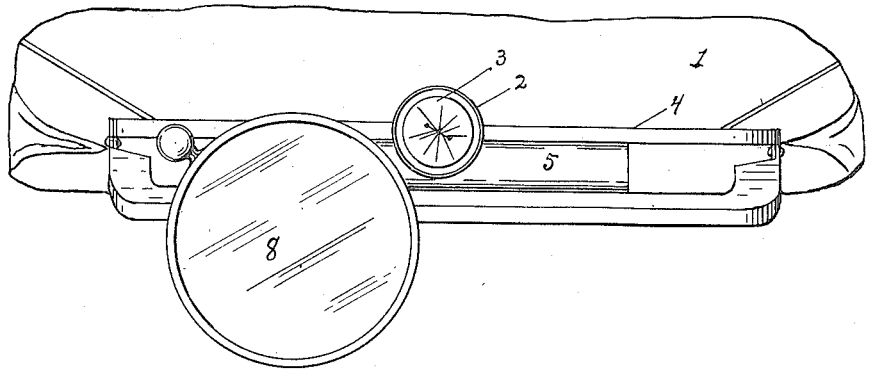

Figure 1 is a side elevation of a purse provided with my improvements and showing the mirror in position to light the interior of the purse, the battery and electric circuit in dotted lines and the mirror when concealed within the purse also shown in dotted lines; and, Fig. 2 is a top plan view, showing the mirror in position for viewing the face, etc., in the dark.

Similar reference numbers refer to similar parts throughout the several views of the drawings.

The purse, 1, is of the conventional form and provided with the usual catch knob, 2. The knob 2 is hollow and open at the top. Within it is provided a socket for an electric light bulb, 3, which is preferably electrically grounded on the knob and the frame, 4, of the purse. A battery, 5, is placed in the purse, and one pole thereof is connected with the lamp 3 and the other pole with the switch, 6, which is preferably mounted on frame 4 and provided with a manipulating button, 7. To light lamp 3 the switch is shifted to the position shown by the dotted lines and thereby its pole is grounded on frame 1, and the circuit through lamp 3 is closed. A mirror, 8, is mounted on a bracket, 9, secured to frame 4, by means of an arm, 10, so that it may be swung out of the purse, to any desired position, as shown, or swung into the purse, as shown by dotted lines in Fig. 1. Mirror 8 is mounted on arm 10 by a ball and socket, friction controlled, universal joint, so that it may be swung into any desired position, thus it may be turned face downward, as in Fig. 1, or upward, as in Fig. 2.

It will be understood that when the mirror is arranged in the position shown in Fig. 1, the light is reflected into the purse, so that the contents may be seen, change may be made, and articles may be selected, while in the position shown in Fig. 2 the light may be thrown on the person and the mirror used for adjusting the apparel etc. When the purse is closed, the lamp may be used to light the way or to search for lost objects in the dark.

Having thus described my invention, so that any one skilled in the art pertaining thereto may make and use it, I claim—

1. A novelty, comprising a purse or hand bag, an electric light mounted in the catch knob of said purse or hand bag, an arm pivotally mounted on the frame of said purse or hand bag, and a mirror mounted on said arm by a universal joint.

2. A novelty, comprising a purse or hand bag, and a mirror adjustably mounted on the frame of said purse or hand bag, by a universal joint, for universal adjustment.

3. A novelty, comprising a purse or hand bag, an electric lamp mounted in the catch knob of said purse or hand bag, and a mirror adjustably mounted on the frame of said purse or hand bag, by a friction controlled, universal joint.

JAMES DAVID RAUDEBAUGH.

Witnesses:
ABRAHAM KNOBEL,
MOLLIE K. SCULL.